(12) United States Patent
Toshioka et al.

(10) Patent No.: US 8,783,023 B2
(45) Date of Patent: Jul. 22, 2014

(54) EXHAUST GAS PURIFICATION SYSTEM FOR INTERNAL COMBUSTION ENGINE

(75) Inventors: Shunsuke Toshioka, Susono (JP); Shinya Hirota, Susono (JP); Kazuhiro Itoh, Mishima (JP); Koichiro Fukuda, Numazu (JP); Akira Mikami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 13/696,972

(22) PCT Filed: May 12, 2010

(86) PCT No.: PCT/JP2010/058036
§ 371 (c)(1),
(2), (4) Date: Nov. 8, 2012

(87) PCT Pub. No.: WO2011/142011
PCT Pub. Date: Nov. 17, 2011

(65) Prior Publication Data
US 2013/0055703 A1    Mar. 7, 2013

(51) Int. Cl.
*F01N 3/00*    (2006.01)
*F01N 3/02*    (2006.01)
*F01N 3/20*    (2006.01)

(52) U.S. Cl.
USPC .................. 60/295; 60/286; 60/299; 60/301

(58) Field of Classification Search
CPC . F01N 3/2033; F01N 3/2066; F01N 2610/02; F01N 13/02; Y02T 10/24; Y02T 10/47
USPC ...................................... 60/286, 295, 299, 301
See application file for complete search history.

(56) References Cited

U.S. PATENT DOCUMENTS

| | | | | |
|---|---|---|---|---|
| 6,581,374 B2* | 6/2003 | Patchett et al. | ................. | 60/286 |
| 6,662,553 B2* | 12/2003 | Patchett et al. | ................. | 60/286 |
| 6,742,330 B2* | 6/2004 | Genderen | ........................ | 60/286 |
| 8,635,855 B2* | 1/2014 | Mital et al. | ...................... | 60/295 |
| 2008/0175776 A1 | 7/2008 | Jacob | | |
| 2009/0126347 A1* | 5/2009 | Gabe et al. | ...................... | 60/285 |
| 2009/0308054 A1 | 12/2009 | Satoh et al. | | |
| 2010/0089042 A1* | 4/2010 | King et al. | ...................... | 60/295 |
| 2010/0192547 A1 | 8/2010 | Yabe et al. | | |
| 2010/0319320 A1* | 12/2010 | Mital et al. | ...................... | 60/285 |
| 2010/0319324 A1* | 12/2010 | Mital | .............................. | 60/286 |
| 2010/0326059 A1* | 12/2010 | Mital et al. | ...................... | 60/297 |

FOREIGN PATENT DOCUMENTS

| | | |
|---|---|---|
| JP | A-08-284641 | 10/1996 |
| JP | A-2007-146784 | 6/2007 |

(Continued)

*Primary Examiner* — Thomas Denion
*Assistant Examiner* — Dapinder Singh
(74) *Attorney, Agent, or Firm* — Oliff PLC

(57) ABSTRACT

An object of the present invention is to increase the flexibility in the layout of an exhaust gas purification system for an internal combustion engine including selective catalytic reduction catalyst provided in an exhaust passage of the internal combustion engine and an addition device for supplying reducing agent derived from ammonia to the selective catalytic reduction catalyst, without a deterioration of the performance in reducing nitrogen oxides. To achieve the object, the exhaust gas purification system for an internal combustion engine according to the present invention is configured to supply hydrocarbon at the same time when reducing agent derived from ammonia is supplied to the selective catalytic reduction catalyst, thereby producing reducing agent that is hard to be oxidized by a precious metal catalyst.

6 Claims, 5 Drawing Sheets

(56) References Cited

FOREIGN PATENT DOCUMENTS

| | | |
|---|---|---|
| JP | A-2008-031970 | 2/2008 |
| JP | A-2008-157188 | 7/2008 |
| JP | A-2008-545085 | 12/2008 |
| JP | A-2009-013931 | 1/2009 |
| JP | A-2009-228611 | 10/2009 |
| JP | A-2010-096126 | 4/2010 |

* cited by examiner

EXHAUST GAS PURIFICATION SYSTEM FOR INTERNAL COMBUSTION ENGINE

TECHNICAL FIELD

The present invention relates to an exhaust gas purification system for an internal combustion engine, in particular to an exhaust gas purification system equipped with a catalyst that reduces nitrogen oxides ($NO_x$) in the exhaust gas with supply of ammonia.

BACKGROUND ART

There has been known an SCR (Selective Catalytic Reduction) system equipped with a selective catalytic reduction catalyst provided in an exhaust passage of an internal combustion engine and a reducing agent addition valve provided in the exhaust passage upstream of the selective catalytic reduction catalyst, in which a compound or composition derived from ammonia is added through the aforementioned reducing agent addition valve.

With increasingly strict exhaust emission control, there arises a need for adding an oxidation catalyst and/or particulate filter to SCR systems. Thus, systems equipped with a fuel addition valve, an oxidation catalyst, a particulate filter, a urea addition valve, a selective catalytic reduction catalyst, and an ammonia oxidation catalyst arranged in an exhaust passage in order from upstream have been developed (see, for example, Patent Document 1).

Patent Document 2 describes a system in which a urea addition valve, an oxidation catalyst, a particulate filter, and a selective catalytic reduction catalyst are arranged in an exhaust passage in order from upstream. Patent Document 3 describes a system in which a particulate filter and a selective catalytic reduction catalyst are arranged in an exhaust passage in order from upstream, and urea and fuel are added at a location between the particulate filter and the selective catalytic reduction catalyst. Patent Document 4 describes an exhaust gas purification catalyst having an oxidizing ability and a selective reduction ability.

PRIOR ART DOCUMENTS

Patent Documents

Patent Document 1: Japanese Patent Application Laid-Open No. 2009-013931
Patent Document 2: Japanese Patent Application Laid-Open No. 2008-545085
Patent Document 3: Japanese Patent Application Laid-Open No. 2008-157188
Patent Document 4: Japanese Patent Application Laid-Open No. 2008-031970

SUMMARY OF THE INVENTION

Problems to be Solved by the Invention

In cases where a selective catalytic reduction catalyst includes a precious metal catalyst or in cases where a precious metal catalyst is provided in an exhaust passage downstream of a reducing agent addition valve and upstream of a selective catalytic reduction catalyst (between the reducing agent valve and the selective catalytic reduction catalyst), there is a possibility that reducing agent derived from ammonia added by the reducing agent addition valve is oxidized by the precious metal catalyst to become nitrogen oxides ($NO_x$).

When this occurs, the amount of nitrogen oxides ($NO_x$) reduced in the selective catalytic reduction catalyst will become smaller, and nitrogen oxides ($NO_x$) will be produced in the selective catalytic reduction catalyst. A possible countermeasure against this is to adopt a system like that disclosed in the aforementioned Patent Document 1. However, this can lead to a decrease in the ease of installation of the exhaust gas purification system in a vehicle and/or an increase in the manufacturing cost due to a decrease in the flexibility in the layout of the exhaust gas purification system.

The present invention has been made in view of the above-described various circumstances, and an object thereof is to increase the flexibility in the layout of an exhaust gas purification system for an internal combustion engine including an SCR system, without a deterioration of the performance in reducing nitrogen oxides ($NO_x$).

Means for Solving the Problems

To achieve the above-described object, the inventors of the present invention focused on the fact that decrease in the $NO_x$ reducing rate in a selective catalytic reduction catalyst including a precious metal catalyst can be prevented by supplying reducing agent derived from ammonia and hydrocarbon (or fuel) at the same time to the selective catalytic reduction catalyst.

When only reducing agent derived from ammonia is supplied to a selective catalytic reduction catalyst including a precious metal catalyst, the amount of nitrogen oxides ($NO_x$) flowing out of the selective catalytic reduction catalyst increases. This is considered to be because the reducing agent is oxidized by the precious metal catalyst before it reacts with nitrogen oxides ($NO_x$).

If the reducing agent is oxidized by the precious metal catalyst, the amount of nitrogen oxide ($NO_x$) reduced in the selective catalytic reduction catalyst decreases. Moreover, if the reducing agent is oxidized by the precious metal catalyst, nitrogen oxides ($NO_x$) are newly produced. In consequence, the amount of nitrogen oxides ($NO_x$) flowing out of the selective catalytic reduction catalyst increases. This phenomenon is outstanding when the temperature of the selective catalytic reduction catalyst (i.e. the bed temperature of the selective catalytic reduction catalyst or the temperature of the gas passing through the selective catalytic reduction catalyst) is high (e.g. in a range of 200° C. to 300° C. or higher).

The inventors of the present invention find that the amount of nitrogen oxides ($NO_x$) flowing out of the selective catalytic reduction catalyst is decreased by supplying reducing agent derived from ammonia and hydrocarbon at the same time to a selective catalytic reduction catalyst including a precious metal catalyst, as the result of conducting experiments and verifications strenuously.

The inventors of the present invention also found that when reducing agent derived from ammonia and hydrocarbon are supplied at the same time, the amount of nitrogen oxides ($NO_x$) flowing out of the selective catalytic reduction catalyst is decreased even if the temperature of the selective catalytic reduction catalyst including the precious metal catalyst is high.

Although the precise mechanism of the above phenomena has not been elucidated, it is considered that reducing agent derived from ammonia and hydrocarbon physically or chemically combine together or react before flowing into the selective catalytic reduction catalyst, thereby producing heavy reducing agent that is hard to be oxidized by the precious metal catalyst.

Hence, in the present invention, at the time when reducing agent derived from ammonia is supplied to the selective catalytic reduction catalyst including the precious metal catalyst, hydrocarbon is supplied together.

Specifically, the exhaust gas purification system for an internal combustion engine according to the present invention, comprises:

a selective catalytic reduction catalyst which is provided in an exhaust passage of the internal combustion engine and which includes a precious metal catalyst;

an addition device which is provided in the exhaust passage upstream of the selective catalytic reduction catalyst and which adds reducing agent derived from ammonia to exhaust gas;

a fuel supply device which supplies fuel to exhaust gas at a location upstream of the selective catalytic reduction catalyst; and a control unit which causes the fuel supply device to supply fuel at the time when reducing agent is added to exhaust gas by the addition device.

According to the present invention defined above, when reducing agent derived from ammonia is supplied to the selective catalytic reduction catalyst including the precious metal catalyst, oxidation of reducing agent by the precious metal catalyst can be prevented or reduced. In consequence, decrease of the $NO_x$ reducing rate in the selective catalytic reduction catalyst is prevented or reduced.

Therefore, the precious metal catalyst and the selective catalytic reduction catalyst can be supported on one substrate or carrier. Furthermore, in the case where the selective catalytic reduction catalyst is arranged downstream of the precious metal catalyst, the addition apparatus may be arranged upstream of the precious metal catalyst. Such enhancement of the flexibility in the layout of the exhaust gas purification system can lead to an improvement in the ease of installation of the exhaust gas purification system in a vehicle and a reduction in the manufacturing cost.

The inventors of the present invention also found that when the temperature of the selective catalytic reduction catalyst is low, a high nitrogen oxide ($NO_x$) reducing rate is achieved by making the amount of reducing agent derived from ammonia larger and making the amount of hydrocarbon smaller, in comparison with the time the temperature of the selective catalytic reduction catalyst is high. Stated in another way, the inventors of the present invention found that when the temperature of the selective catalytic reduction catalyst is high, a high nitrogen oxide ($NO_x$) reducing rate is achieved by making the amount of reducing agent derived from ammonia smaller and making the amount of hydrocarbon larger in comparison with the time when the temperature of the selective catalytic reduction catalyst is low.

Therefore, the control unit in the present invention may be configured to adjust the addition amount of reducing agent derived from ammonia and the supply amount of hydrocarbon in accordance with the temperature of the selective catalytic reduction catalyst. For example, the control unit may make the addition amount of reducing agent larger and make the supply amount of hydrocarbon smaller when the temperature of the selective catalytic reduction catalyst is low than when it is high. Such adjustment of the addition amount of reducing agent and the supply amount of hydrocarbon can enhance the nitrogen oxide ($NO_x$) reducing rate irrespective of the temperature of the selective catalytic reduction catalyst.

The exhaust gas purification system for an internal combustion engine according to the present invention may further be provided with a temperature control device which is provided in the exhaust passage upstream of the selective catalytic reduction catalyst and which controls the temperature of exhaust gas. With this feature, the temperature of the selective catalytic reduction catalyst can be controlled by the temperature control device. Therefore, the temperature of exhaust gas can be adjusted in such a way that the ratio of the amount of reducing agent derived from ammonia and the amount of hydrocarbon becomes a desired ratio.

The "desired ratio" mentioned above may be determined appropriately according to characteristics of the internal combustion engine or the vehicle equipped with the internal combustion engine. The desired ratio may be changed fitly in accordance with the remaining amount of reducing agent derived from ammonia and the remaining amount of hydrocarbon. For example, when the remaining mount of reducing agent derived ammonia is small, the temperature of exhaust gas may be made higher in comparison with the time when the remaining amount of reducing agent is large, whereby the nitrogen oxide ($NO_x$) reducing rate can be kept high while making the addition amount of reducing agent derived from ammonia small. Similarly, when the remaining mount of hydrocarbon is small, the temperature of exhaust gas may be made lower in comparison with the time when the remaining amount of hydrocarbon is large, whereby the nitrogen oxide ($NO_x$) reducing rate can be kept high while making the supply amount of hydrocarbon small.

As the temperature control device, the use may be made of a burner which burns fuel and secondary air. When the burner is fired, the temperature of exhaust gas can be raised by the heat generated by burning of fuel and secondary air. When secondary air is supplied without the burner being fired, the temperature of exhaust gas can be lowered by secondary air.

If fuel is supplied without the burner being fired or if the burner is fired in an excessively high fuel concentration condition, burner can supply hydrocarbon to the exhaust gas. Thus, the burner can also function as a fuel supply apparatus.

Advantageous Effect of the Invention

The present invention can increase the flexibility in the layout of an exhaust gas purification system for an internal combustion engine including an SCR system, without a deterioration of the performance in reducing nitrogen oxides ($NO_x$).

EMBODIMENTS FOR CARRYING OUT THE INVENTION

In the following, specific embodiments of the present invention will be described with reference to the drawings.

The dimensions, materials, shapes, relative arrangements, and other features of the components that will be described in connection with the embodiments are not intended to limit the technical scope of the present invention only to them, unless particularly stated.

Embodiment 1

Figure 1:
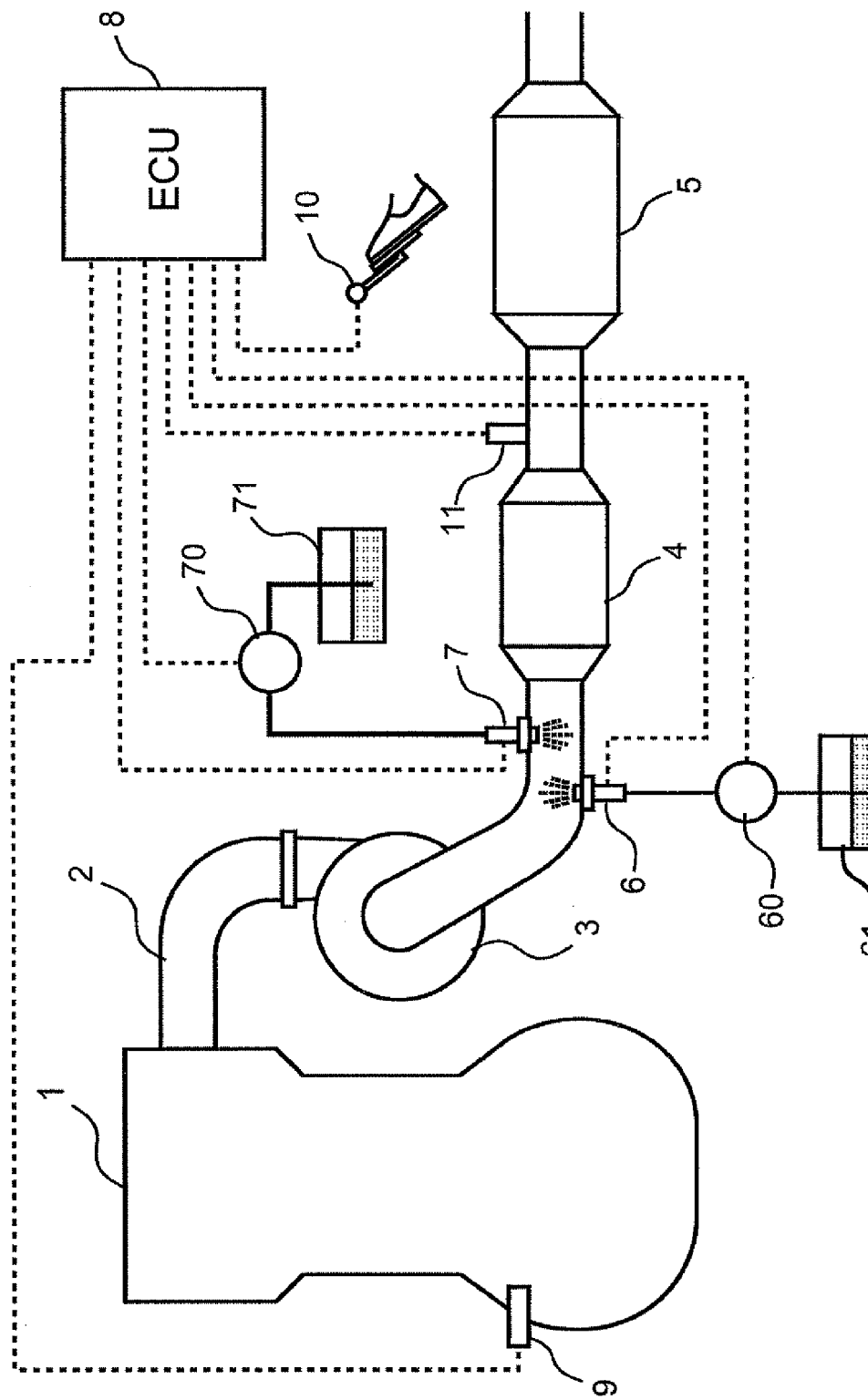
FIG. 1 is a diagram showing the general configuration of an exhaust system of an internal combustion engine according to a first embodiment.

A first embodiment of the present invention will first be described with reference to FIGS. 1 to 4. FIG. 1 is a diagram showing the general configuration of an exhaust system of an internal combustion engine to which the present invention is applied. While the internal combustion engine 1 shown in FIG. 1 is a compression ignition internal combustion engine (diesel engine), the engine may be a spark ignition internal combustion engine (gasoline engine).

In FIG. 1, the internal combustion engine 1 is connected with an exhaust passage 2. The exhaust passage 2 is a passage through which gas (exhaust gas) flowing out of the cylinders of the internal combustion engine 1 is to flow. In the middle of the exhaust passage 2, a turbine 3 of a centrifugal supercharger (or turbocharger) is provided. An exhaust gas purification apparatus 4 is provided in the exhaust passage 2 downstream of the turbine 3.

The exhaust gas purification apparatus 4 has a cylindrical casing which houses a selective catalytic reduction catalyst. The selective catalytic reduction catalyst comprises a monolithic substrate which is made of cordierite or a heat-resisting steel of e.g. an Fe—Cr—Al system and which has a honeycomb cross section. And, the substrate is coated with an alumina-based or zeolite-based active material (carrier). Furthermore, a precious metal catalyst (e.g. platinum: Pt) having an oxidizing ability is supported on the aforementioned carrier.

A particulate filter 5 is provided in the exhaust passage downstream of the aforementioned exhaust gas purification apparatus 4. The particulate filter 5 is used to trap particulate matter (PM) contained in the exhaust gas.

A fuel addition valve 6 and a reducing agent addition valve 7 are provided in the exhaust passage 2 between the aforementioned turbine 3 and the exhaust gas purification apparatus 4. The fuel addition valve 6 is connected with a fuel tank 61 via a first pump 60. The first pump 60 sucks fuel stored in the fuel tank 61 and pumps the sucked fuel to the fuel addition valve 6. The fuel addition valve 6 adds the fuel supplied from the first pump 60 to the exhaust gas in the exhaust passage 2. The fuel addition valve 6, the first pump 60, and the fuel tank 61 constitute an embodiment of the fuel supply device according to the present invention.

The aforementioned reducing agent addition valve 7 is connected to a reducing agent tank 71 via a second pump 70. The second pump 70 sucks reducing agent stored in the reducing agent tank 71 and pumps the sucked reducing agent to the reducing agent addition valve 7. The reducing agent addition valve 7 supplies the reducing agent supplied from the second pump 70 into the interior of the exhaust passage 2. The reducing agent addition valve 7, the second pump 70, and the reducing agent tank 71 constitute an embodiment of the addition device according to the present invention.

The reducing agent stored in the reducing agent tank 71 is a reducing agent derived from ammonia. As the reducing agent derived from ammonia, aqueous solution of, for example, urea or ammonium carbamate may be used. In this embodiment, aqueous solution of urea is used as the reducing agent derived from ammonia.

The fuel addition valve 6, the reducing agent addition valve 7, the first pump 60, and the second pump 70 are adapted to be electrically controlled by an ECU 8. The ECU 8 is an electronic control unit composed of a CPU, ROM, RAM, and backup RAM etc. The ECU 8 controls the aforementioned devices using as parameters signals output from various sensors such as a crank position sensor 9, an accelerator position sensor 10, and an exhaust gas temperature sensor 11.

The aforementioned crank position sensor 9 is a sensor that outputs an electrical signal indicative of the rotational position of the output shaft (crankshaft) of the internal combustion engine 1. The accelerator position sensor 10 is a sensor that outputs an electrical signal indicative of the amount of operation of the accelerator pedal (accelerator opening degree). The exhaust gas temperature sensor 11 is a sensor that is attached to the exhaust passage between the exhaust gas purification apparatus 4 and the particulate filter 5 and outputs an electrical signal indicative of the temperature of the exhaust gas flowing out of the exhaust gas purification apparatus 4.

Now, a method of controlling the reducing agent addition valve 7 (and the second pump 70) will be described. Aqueous solution of urea added to the exhaust gas through the reducing agent addition valve 7 is thermally decomposed and hydrolyzed in the exhaust gas or in the exhaust gas purification apparatus 4 to produce ammonia ($NH_3$). Ammonia ($NH_3$) thus produced is adsorbed or stored by the selective catalytic reduction catalyst in the exhaust gas purification apparatus 4. The ammonia ($NH_3$) adsorbed or store by the selective catalytic reduction catalyst reacts with nitrogen oxides ($NO_x$) contained in the exhaust gas to produce nitrogen ($N_2$) and water ($H_2O$). In other words, ammonia ($NH_3$) acts as a reducing agent for nitrogen oxides ($NO_x$).

If the quantity of aqueous solution of urea added to the exhaust gas through the reducing agent addition valve 7 is excessively small, the amount of ammonia ($NH_3$) adsorbed by the selective catalytic reduction catalyst (or ammonia adsorption amount) becomes small. In consequence, a portion of nitrogen oxides ($NO_x$) contained in the exhaust gas will not be reduced. On the other hand, if the quantity of aqueous solution of urea added to the exhaust gas through the reducing agent addition valve 7 is excessively large, a portion of ammonia ($NH_3$) will not be adsorbed by the selective catalytic reduction catalyst.

Therefore, it is desirable that the quantity of aqueous solution of urea added be controlled in such a way that an appropriate amount (target amount) of ammonia is adsorbed by the selective catalytic reduction catalyst. The target amount mentioned above is an amount equal to the maximum amount of ammonia (saturation ammonia amount) that the selective catalytic reduction catalyst can adsorb minus a predetermined margin.

The saturation ammonia amount changes in correlation with the temperature of the selective catalytic reduction catalyst (bed temperature). For example, the saturation ammonia amount is smaller when the temperature of the selective catalytic reduction catalyst is high than when it is low. Therefore, it is desirable that the aforementioned target amount be changed in accordance with the temperature of the selective catalytic reduction catalyst.

Hence, the ECU 8 is configured to calculate the target amount using as a parameter the temperature of the selective catalytic reduction catalyst. In calculating it, the ECU 8 may use a map specifying the relationship between the temperature of the selective catalytic reduction catalyst and the target amount. Although a value measured by a dedicated temperature sensor may be used as the temperature of the selective catalytic reduction catalyst, the signal output from the exhaust gas temperature sensor 11 is used alternatively in this embodiment. In this case, the exhaust gas temperature sensor 11 corresponds to the measuring unit in the present invention.

After determining the target amount in the above-described manner, the ECU 8 controls the reducing agent addition valve 7 in such a way that the actual amount of adsorbed ammonia becomes equal to the aforementioned target amount. Specifically, the ECU 8 first calculates the amount of nitrogen oxides ($NO_x$) discharged from the internal combustion engine 1 per unit time ($NO_x$ discharge amount). The $NO_x$ discharge amount may be calculated using a map in which the output signal of the accelerator position sensor 10 (accelerator opening degree) and the engine rotational speed are arguments.

Subsequently, the ECU 8 calculates a reducing rate of nitrogen oxides ($NO_x$) ($NO_x$ reducing rate) in the selective catalytic reduction catalyst. The "$NO_x$ reducing rate" mentioned here is a value equal to the proportion of the amount of nitrogen oxides ($NO_x$) reduced in the selective catalytic reduction catalyst to the amount of nitrogen oxides ($NO_x$) flowing into the selective catalytic reduction catalyst. The $NO_x$ reducing rate is calculated using as parameters the temperature of the selective catalytic reduction catalyst and the exhaust gas flow rate. In calculating it, the use may be made of a map specifying the relationship between the $NO_x$ reducing rate versus the temperature of the selective catalytic reduction catalyst and the exhaust gas flow rate prepared in advance.

The ECU 8 calculates the amount of ammonia ($NH_3$) consumed per unit time (ammonia consumption amount) to reduce nitrogen oxides ($NO_x$) using as parameters the $NO_x$ discharge amount and the $NO_x$ reducing rate.

The ECU 8 calculates the amount of ammonia ($NH_3$) adsorbed by the selective catalytic reduction catalyst per unit time by subtracting the ammonia consumption amount from the amount of ammonia ($NH_3$) supplied to the selective catalytic reduction catalyst per unit time. The ECU 8 calculates the actual amount of adsorbed ammonia by integrating the amount of ammonia ($NH_3$) adsorbed by the selective catalytic reduction catalyst per unit time.

When the actual amount of adsorbed ammonia is smaller than the target amount, the ECU 8 calculates a target addition amount of ammonia ($NH_3$) (which will be hereinafter referred to as the "reference addition amount") using as a parameter the difference between the actual amount of adsorbed ammonia and the target amount, and performs the addition of aqueous solution of urea according to the reference addition amount. On the other hand, when the actual amount of adsorbed ammonia is not smaller than the target amount, the ECU 8 stops the addition of aqueous solution of urea.

The exhaust gas purification apparatus 4 according to the present invention includes the selective catalytic reduction catalyst and the precious metal catalyst. Therefore, there is a possibility that a portion of ammonia ($NH_3$) supplied to the exhaust gas purification apparatus 4 is oxidized by the precious metal catalyst before adsorbed or stored by the selective catalytic reduction catalyst. When this is the case, the $NO_x$ reducing rate in the selective catalytic reduction catalyst becomes lower. Furthermore, oxidation of ammonia ($NH_3$) produces additional nitrogen oxides ($NO_x$). In consequence, there is a possibility that a relatively large amount of nitrogen oxides ($NO_x$) flows out of the selective catalytic reduction catalyst.

In view of this, the system according to this embodiment is configured to cause the fuel addition valve 6 to add fuel at the same time when causing the reducing agent addition valve 7 to add aqueous solution of urea. In other words, at the time when aqueous solution of urea is added, fuel is also added together.

The inventors of the present invention find that the combined addition of aqueous solution of urea and fuel reduces the decrease in the $NO_x$ reduction rate, as the result of conducting experiments and verifications strenuously. Furthermore, the inventors of the present invention also found that the amounts (or ratio thereof) of ammonia ($NH_3$) and hydrocarbon (HC) needed to reduce nitrogen oxides ($NO_x$) vary depending on the temperature of the selective catalytic reduction catalyst.

Figure 2:
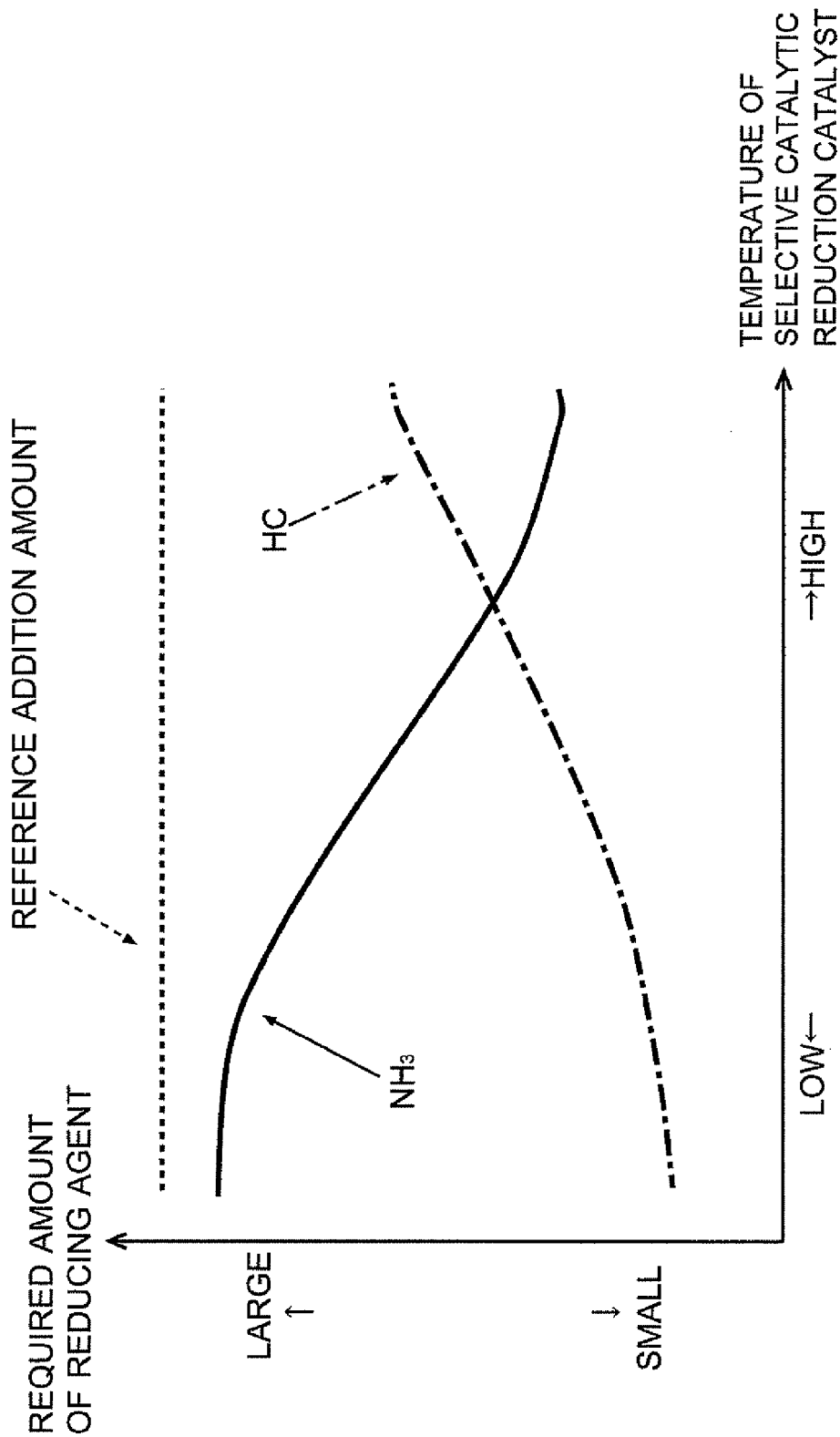
FIG. 2 is a graph showing the change in the required amount of reducing agent in relation to the change in the temperature of the selective catalytic reduction catalyst.

FIG. 2 is a graph showing the change in the required amounts of reducing agents in relation to the change in the temperature of the selective catalytic reduction catalyst. The required amounts shown in FIG. 2 include the amount of ammonia ($NH_3$) and the amount of hydrocarbon (HC) needed to reduce a specific amount of nitrogen oxides ($NO_x$). In FIG. 2, the solid curve represents the required amount of ammonia ($NH_3$), the dot-and-dash curve represents the required amount of hydrocarbon (HC), and the broken line represents the reference addition amount of ammonia ($NH_3$).

As shown in FIG. 2, when the temperature of the selective catalytic reduction catalyst is high, the required amount of ammonia ($NH_3$) is smaller and the required amount of hydrocarbon (HC) is larger in comparison with the time when the temperature of the selective catalytic reduction catalyst is low. Inversely, when the temperature of the selective catalytic reduction catalyst is low, the required amount of ammonia ($NH_3$) is larger and the required amount of hydrocarbon (HC) is smaller in comparison with the time when the temperature of the selective catalytic reduction catalyst is high.

The ratio of the required amount of ammonia ($NH_3$) and the required amount of hydrocarbon (HC) (which will be hereinafter referred to as the "addition ratio") shown in FIG. 2 is prepared as a map by an adaptation process based on, for example, an experiment. The ECU 8 determines the amount of ammonia ($NH_3$) to be added and the amount of hydrocarbon (HC) to be added based on the temperature of the selective catalytic reduction catalyst and the map shown in FIG. 2. Specifically, the ECU 8 calculates the amount of ammonia ($NH_3$) to be added and the amount of hydrocarbon (HC) to be added by multiplying the aforementioned reference addition amount by the addition ratio.

Figure 3:
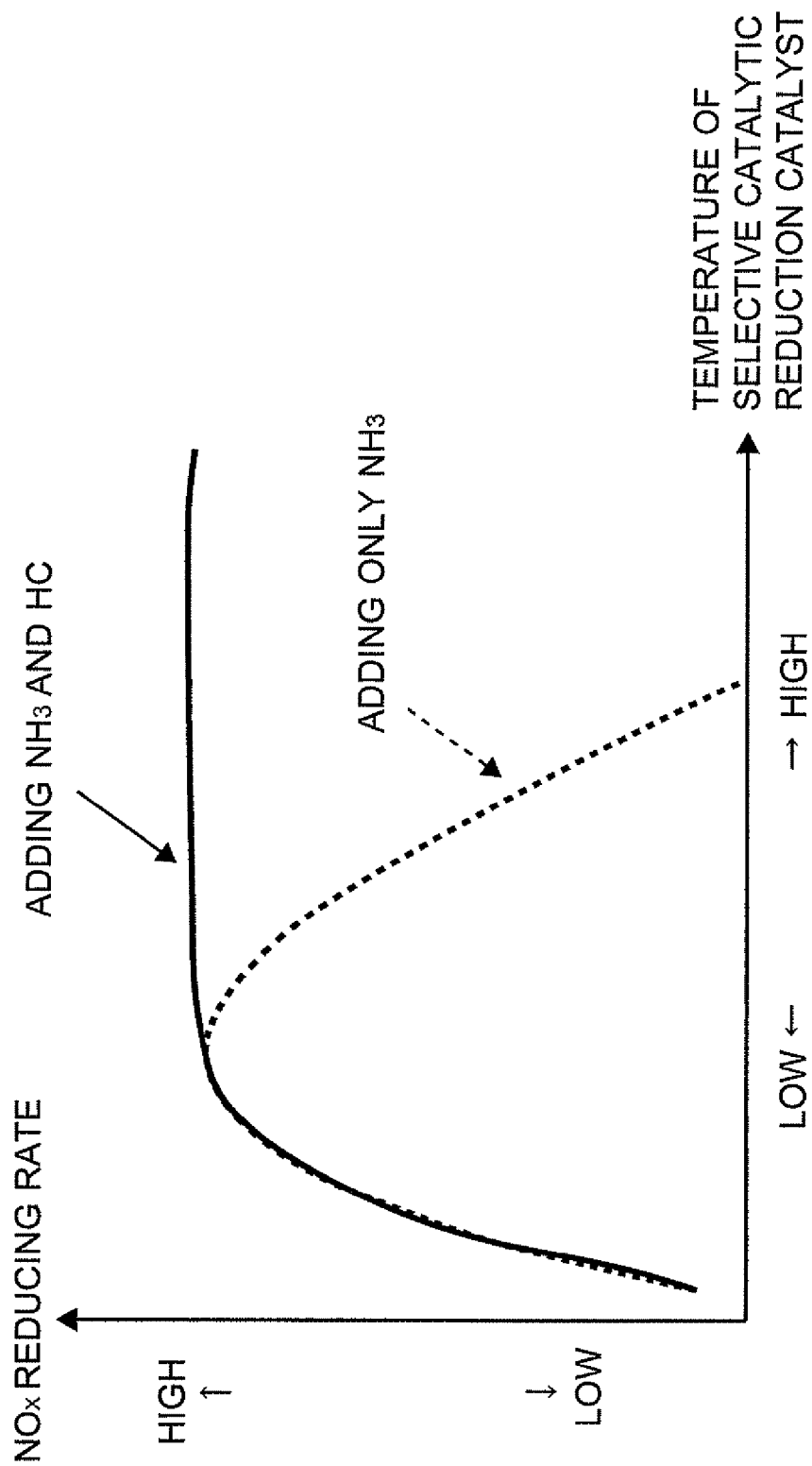
FIG. 3 is a graph showing the relationship between the temperature of the selective catalytic reduction catalyst and the $NO_x$ reducing rate.

FIG. 3 is a graph showing the relationship between the temperature of the selective catalytic reduction catalyst and the $NO_x$ reducing rate. The solid curve in FIG. 3 represents the $NO_x$ reducing rate in a case where ammonia ($NH_3$) and hydrocarbon (HC) are added in accordance with the addition ratio specified by FIG. 2 referred to in the above. The broken curve in FIG. 3 represents the $NO_x$ reducing rate in a case where only ammonia ($NH_3$) is added in accordance with the reference addition amount.

In FIG. 3, in the case where only ammonia ($NH_3$) is added, the $NO_x$ reducing rate decreases as the temperature of the selective catalytic reduction catalyst increases. In contrast, in the case where ammonia ($NH_3$) and hydrocarbon (HC) are added, the $NO_x$ reducing rate is kept high irrespective of the temperature of the selective catalytic reduction catalyst.

Hence, the precious metal catalyst and the selective catalytic reduction catalyst may be supported on one carrier or substrate. Consequently, the flexibility in the layout of the exhaust gas purification system including the addition device and the selective catalytic reduction catalyst can be increased. For example, the selective catalytic reduction catalyst and the oxidation catalyst may be supported on one substrate or carrier, or the selective catalytic reduction catalyst and the oxidation catalyst may be supported on the substrate of a particulate filter.

Since the required amount of ammonia ($NH_3$) is smaller than the reference addition amount as shown in FIG. 2 referred to in the above, the consumption of the aqueous solution of urea can be made small. This allows a reduction in the capacity of the reducing agent tank 71, leading to an improvement in the ease of installation of the reducing agent tank in a vehicle.

Figure 4:
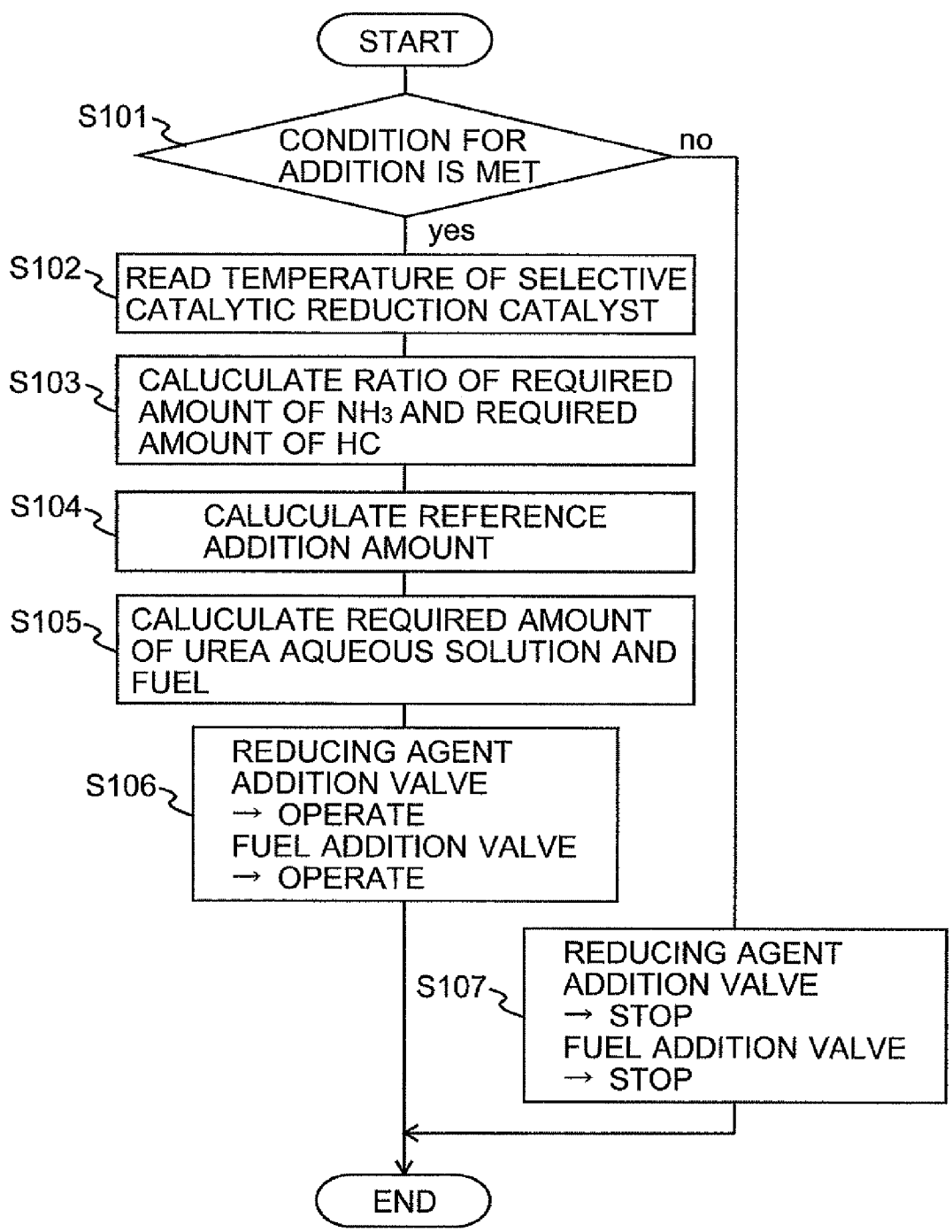
FIG. 4 is a flow chart of a reducing agent addition process routine.

A process of addition of reducing agent in this embodiment will be described with reference to FIG. 4. FIG. 4 is a flow chart of a reducing agent addition process routine. This addition process routine is stored in the ROM of the ECU 8 in advance and executed by the ECU 8 at regular intervals.

In the addition process routine, the ECU 8 first determines, in step S101, whether or not a condition for addition is met. For example, the ECU 8 determines that the condition for addition is met if the actual amount of adsorbed ammonia is smaller than the target amount.

If the determination in the above step S101 is negative, the ECU 8 proceeds to step S107, where it stops the operation of the reducing agent addition valve 7 and the fuel addition valve 6. In other words, the ECU 8 suspends the addition of aqueous solution of urea and the addition of fuel.

If the determination in the above step S101 is affirmative, the ECU 8 proceeds to step S102. In step S102, the ECU 8 reads the temperature of the selective catalytic reduction catalyst. As the temperature of the selective catalytic reduction catalyst, the output signal of the exhaust gas temperature sensor 11 is used.

In step S103, the ECU 8 calculates the ratio (addition ratio) of the required amount of ammonia ($NH_3$) and the required amount of hydrocarbon (HC) from the temperature of exhaust gas read in the above step S102 and the map shown in FIG. 2. Then in step S104, the ECU 8 calculates the reference addition amount by subtracting the actual amount of adsorbed ammonia from the target amount of ammonia ($NH_3$) adsorbed in the selective catalytic reduction catalyst.

In step S105, the ECU 8 calculates the required amount of ammonia ($NH_3$) and the required amount of hydrocarbon (HC) using as parameters the addition ratio calculated in the above step S103 and the reference addition amount calculated in the above step S104. The ECU 8 converts the required amount of ammonia ($NH_3$) into the amount of aqueous solution of urea and converts the required amount of hydrocarbon (HC) into the amount of fuel.

Although the addition ratio of ammonia ($NH_3$) and hydrocarbon (HC) is specified in the above-described case shown in FIG. 2, the ratio of the required amount of aqueous solution of urea and the required amount of fuel may be specified.

In step S106, the ECU 8 causes the reducing agent addition valve 7 and the fuel addition valve 6 to operate in accordance with the amount of aqueous solution of urea and the amount of fuel calculated in the above step S105.

The control unit according to the present invention is realized by executing the addition process routine by the ECU 8. In consequence, the $NO_x$ reducing rate of the selective catalytic reduction catalyst can be kept high even in cases where the selective catalytic reduction catalyst and the precious metal catalyst are supported on one carrier or substrate.

Although in this embodiment, a layout in which the selective catalytic reduction catalyst and the precious metal catalyst are supported on the common carrier or substrate has been described by way of example, similar advantages can be enjoyed even with a layout in which the selective catalytic reduction catalyst is arranged in the exhaust passage downstream of the precious metal catalyst and the reducing agent addition valve is arranged upstream of the precious metal catalyst.

In short, similar advantages can be enjoyed irrespective of the layout of the exhaust gas purification system so long as fuel (hydrocarbon: HC) is added at the same time when aqueous solution of urea is added.

Therefore, a variety of layouts are allowed without a deterioration in the $NO_x$ reducing rate of the selective catalytic reduction catalyst. In consequence, it is possible to increase the ease of installation of the exhaust gas purification system in a vehicle and to reduce the manufacturing cost.

In this embodiment the device having the fuel addition valve 6, the first pump 60, and the fuel tank 61 has been described as an example of the fuel supply device according to the present invention. In cases where the internal combustion engine 1 is provided with fuel injection valves that inject fuel into the cylinders, the fuel supply device may be realized by injecting fuel through the fuel injection valve in the cylinder on the exhaust stroke (i.e. the cylinder of which the exhaust valve is open). Alternatively, a burner for burning fuel and secondary air may be used as the fuel supply device.

Embodiment 2

Figure 5:
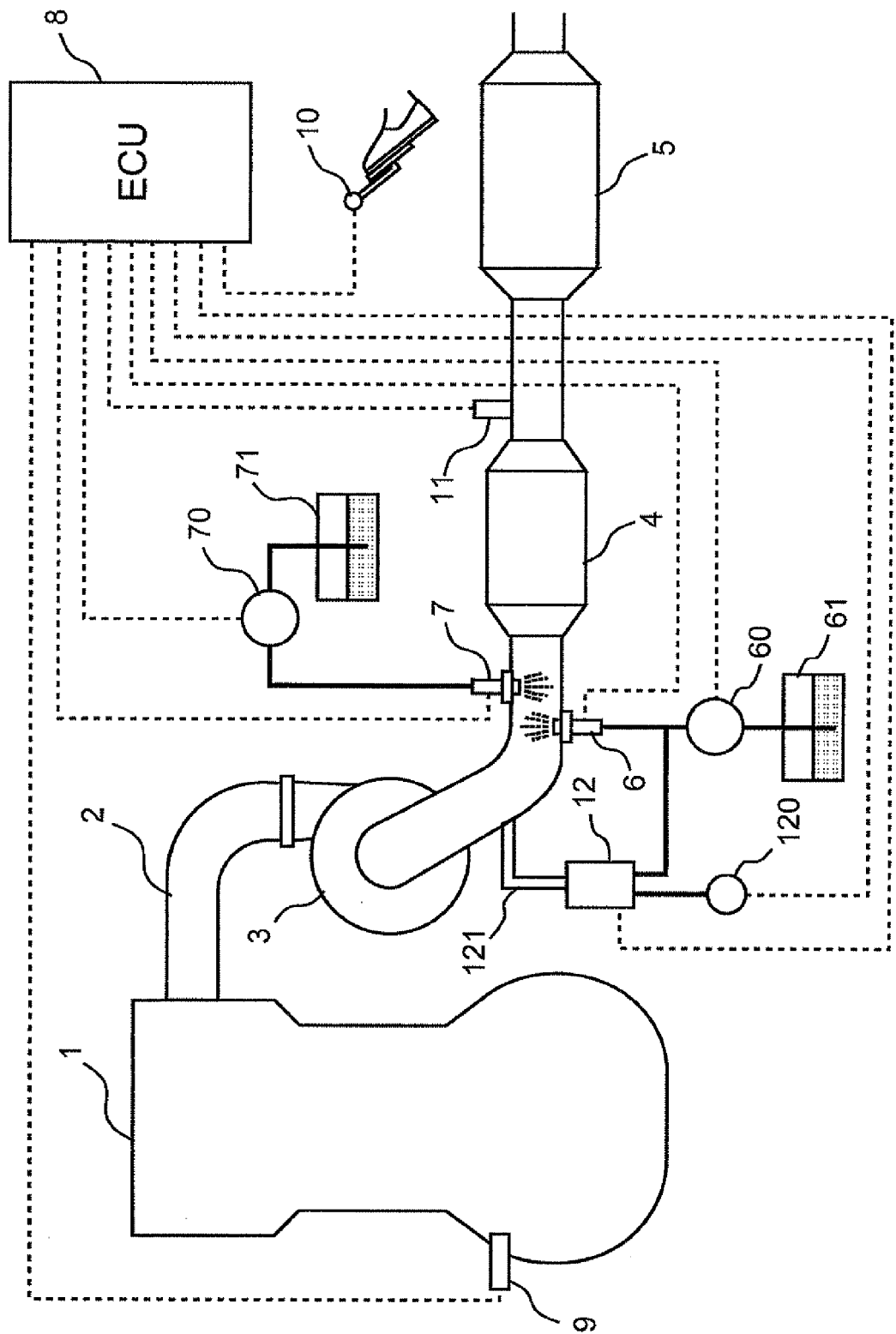
FIG. 5 is a diagram showing the general configuration of an exhaust system of an internal combustion engine according to a second embodiment.

A second embodiment of the present invention will be described with reference to FIG. 5. In the following, features different from those in the above-described first embodiment will be described, and like features will not be described.

What is different in this embodiment from the above-described first embodiment is that a burner 12 is additionally provided in the exhaust passage 2 between the turbine 3 and the exhaust gas purification apparatus 4. The burner 12 is a device that burns secondary air supplied from an air pump 120 and fuel supplied from the first pump 60.

The burner is equipped with an ignition plug that is not shown in the drawing and adapted to burn secondary air and fuel with the operation of the ignition plug. The gas burned in the burner 12 (burned gas) is introduced into the exhaust passage 2 through a discharge pipe 121. Although in the case shown in FIG. 5, the burner 12 and the fuel addition valve 6 use the first pump 60 in common, a dedicated fuel pump for the burner 12 may be provided. The burner 12, the air pump 120, and the first pump 60 constitute the temperature control device according to the present invention.

The above-described burner 12 and the air pump 120 are configured to be electrically controlled by the ECU 8. For example, the ECU 8 causes the burner 12 (or ignition plug), the air pump 120, and the first pump 60 to operate when raising the temperature of the selective catalytic reduction catalyst or when raising the temperature of the particulate filter 5.

In such cases, high temperature burned gas generated in the burner will be introduced into the exhaust passage 2 through the discharge pipe 121. In Consequence, the temperature of the exhaust gas flowing into the selective catalytic reduction catalyst will rise. Consequently, the temperature of the selective catalytic reduction catalyst will rise promptly by receiving the heat of the burned gas.

If it is necessary to heat the selective catalytic reduction catalyst in an active condition to higher temperatures or to oxidize particulate matter (PM) trapped in the particulate filter 5, the ECU 8 may cause the first pump 60 (and the air pump 120) to operate, thereby supplying unburned fuel to the selective catalytic reduction catalyst or the particulate filter 5.

In this case, the unburned fuel will be oxidized in the selective catalytic reduction catalyst or the particulate filter 5.

In consequence, the temperature of the selective catalytic reduction catalyst or the particulate filter 5 will be increased by the reaction heat generated in the oxidation of the unburned fuel.

In this embodiment, furthermore, the ECU 8 controls the burner 12 in such a way that the temperature of the selective catalytic reduction catalyst becomes equal to a target temperature (or a temperature falling within a target temperature range). The "target temperature" mentioned above is, for example, a temperature at which the $NO_x$ reducing rate of the selective catalytic reduction catalyst becomes equal to or higher than a predetermined reference value and at which the ratio of the required amount of ammonia ($NH_3$) and the required amount of hydrocarbon (HC) becomes equal to a desired target ratio.

The "reference value" mentioned above is, for example, a value of the $NO_x$ reducing rate at which the amount of nitrogen oxides ($NO_x$) flowing out of the selective catalytic reduction catalyst becomes equal to or smaller than the permissible limit set by regulation. The "desired ratio" may be a fixed value determined appropriately taking into consideration characteristics of the internal combustion engine, characteristics of the vehicle equipped with the internal combustion engine 1, and/or the capacities of the reducing agent tank 71 and the fuel tank 61, or a variable value varied depending on the remaining amount of urea aqueous solution and the remaining amount of fuel.

For example, when the remaining amount of urea aqueous solution is small, the temperature of exhaust gas may be made higher than when the remaining amount of urea aqueous solution is large. This enables to keep the nitrogen oxide ($NO_x$) reducing rate high while making the addition ratio of urea aqueous solution lower. On the other hand, when the remaining amount of fuel is small, the temperature of exhaust gas may be made lower than when the remaining amount of fuel is large. This enables to keep the nitrogen oxide ($NO_x$) reducing rate high while making the addition ratio of fuel lower.

When raising the temperature of the selective catalytic reduction catalyst, the ECU 8 may cause the ignition plug of the burner 12, the air pump 120, and the first pump 60 to operate. On the other hand, when lowering the temperature of the selective catalytic reduction catalyst, the ECU 8 may cause only the air pump 120 to operate without causing the ignition plug of the burner 12 to operate.

As described above, it is possible to set the ratio of the added amount of aqueous solution of urea and the added amount of fuel to desired ratios by adjusting the temperature of the selective catalytic reduction catalyst using the burner 12.

DESCRIPTION OF THE REFERENCE SIGNS

1: internal combustion engine
2: exhaust passage
3: turbine
4: exhaust gas purification apparatus
5: particulate filter
6: fuel addition valve
7: reducing agent addition valve
8: ECU
9: crank position sensor
10: accelerator position sensor
11: exhaust gas temperature sensor
12: burner
60: first pump
61: fuel tank
70: second pump
71: reducing agent tank
120: air pump
121: discharge pipe

The invention claimed is:

1. An exhaust gas purification system for an internal combustion engine, comprising:
   a selective catalytic reduction catalyst which is provided in an exhaust passage of the internal combustion engine and which includes a precious metal catalyst;
   an addition device which is provided in the exhaust passage upstream of the selective catalytic reduction catalyst and which adds reducing agent derived from ammonia to exhaust gas;
   a fuel supply device which supplies fuel to exhaust gas at a location upstream of the selective catalytic reduction catalyst;
   a control unit which causes the fuel supply device to supply fuel at the time when reducing agent is added to exhaust gas by the addition device; and
   a measuring unit which measures a temperature correlating with the temperature of the selective catalytic reduction catalyst;
   wherein the control unit changes the amount of reducing agent added by the addition device and the amount of fuel supplied by the fuel supply device in accordance with the temperature measured by the measuring unit.

2. An exhaust gas purification system for an internal combustion engine according to claim 1, wherein the control unit controls the addition device and the fuel supply device in such a way as to make the amount of reducing agent smaller and the amount of fuel larger when the temperature measured by the measuring unit is high than when it is low.

3. An exhaust gas purification system for an internal combustion engine according to claim 1, further comprising a temperature control device which is provided in the exhaust passage upstream of the selective catalytic reduction catalyst and which controls the temperature of exhaust gas.

4. An exhaust gas purification system for an internal combustion engine according to claim 3, wherein the temperature control device is a burner that burns fuel and secondary air.

5. An exhaust gas purification system for an internal combustion engine according to claim 2, further comprising a temperature control device which is provided in the exhaust passage upstream of the selective catalytic reduction catalyst and which controls the temperature of exhaust gas.

6. An exhaust gas purification system for an internal combustion engine according to claim 5, wherein the temperature control device is a burner that burns fuel and secondary air.

* * * * *